US007877263B2

(12) United States Patent
Kauppinen

(10) Patent No.: US 7,877,263 B2
(45) Date of Patent: Jan. 25, 2011

(54) SIGNAL PROCESSING

(75) Inventor: Ismo Kauppinen, Ilmarinen (FI)

(73) Assignee: Noveltech Solutions Oy, Turku (FI)

(*) Notice: Subject to any disclaimer, the term of this patent is extended or adjusted under 35 U.S.C. 154(b) by 1040 days.

(21) Appl. No.: 11/640,974

(22) Filed: Dec. 19, 2006

(65) Prior Publication Data

US 2007/0140502 A1 Jun. 21, 2007

(30) Foreign Application Priority Data

Dec. 19, 2005 (FI) ................................. 20051294

(51) Int. Cl.
*G01L 19/00* (2006.01)

(52) U.S. Cl. ....................... 704/500; 704/200; 704/501; 704/503; 704/504

(58) Field of Classification Search ................. 704/500, 704/200, 501, 503, 504
See application file for complete search history.

(56) References Cited

U.S. PATENT DOCUMENTS

| | | | | |
|---|---|---|---|---|
| 5,248,845 | A | 9/1993 | Massie | |
| 5,572,623 | A * | 11/1996 | Pastor | 704/233 |
| 6,581,080 | B1 | 6/2003 | Richards | |
| 2003/0072464 | A1 | 4/2003 | Kates | |
| 2004/0125487 | A9 * | 7/2004 | Sternad et al. | 360/65 |
| 2005/0157891 | A1 * | 7/2005 | Johansen | 381/103 |
| 2005/0219068 | A1 * | 10/2005 | Jones et al. | 341/50 |
| 2005/0249272 | A1 | 11/2005 | Kirkeby et al. | |
| 2006/0035593 | A1 * | 2/2006 | Leeds | 455/67.13 |
| 2008/0091393 | A1 * | 4/2008 | Gustafsson | 703/5 |

OTHER PUBLICATIONS

M.J.L. De Hoon, et al. "Why Yule-Walker Should Not Be Used for Autregressive Modelling" Interfaculty Reactor Institute, Delft University of Technology Mekelweg 15, 2629 JB Delft, The Netherlands, vol. 23, 1996; 10 pages.

Ismo Kauppinen, et al. "A Method for Long Extrapolation of Audio Signals" J. Audio Eng. Soc., vol. 49, No. 12, Dec. 2001, pp. 1167-1179.

A. Harma et al. "Frequency-Warped Signal Processing for Audio Applications" J. Audio Eng. Soc., vol. 48, No. 11, Nov. 2000, pp. 1011-1031.

Gianpaolo Evangelista, et al. "Discrete Frequency Warped Wavelets: Theory and Applications" IEEE Transactions on Signal Processing, vol. 46, No. 4, Apr. 1998, pp. 874-885.

Elmar Krëger et al., "Linear Prediction on a Warped Frequency Scale" IEEE Transactions of Acoustics, Speech, and Signal Processing, vol. 36, No. 9, Sep. 1988, pp. 1529-1531.

J. O. Smith III et al. "Bark and ERB Bilinear Transforms" IEEE Transactions on Speech and Audio Processing, Nov. 1999, 31 pages.

(Continued)

*Primary Examiner*—Qi Han
(74) *Attorney, Agent, or Firm*—Buchanan Ingersoll & Rooney PC

(57) ABSTRACT

In an audio signal processing procedure, auto-regressive (AR) modeling is used to create a residual signal from an input audio signal. The residual signal is further added to the input audio in order to produce a processed output audio signal. The AR modeling can be performed frame-by-frame or sample-by-sample employing frequency warped Burg's method.

18 Claims, 4 Drawing Sheets

OTHER PUBLICATIONS

Kari Roth et al. "Exponential Weighting Method for Sample-by-Sample Update of Warped AR-Model":Proc. of the 7th Int. Conference on Digital Audio Effects (DAFx'04), Naples, Italy Oct. 5-8, 2004, pp. DAFX-1 to DAFX-4.

John Parker Burg "A New Analysis Technique for Time Series Data" Presented at Nato Advance Study Institute on Signal Processing with Emphasis on Underwater Acoustics pp. 15-0-15-7, Aug. 1968.

* cited by examiner

SIGNAL PROCESSING

FIELD OF THE INVENTION

The present invention relates to a field of signal processing and more specifically to systems, methods, devices and computer program applications for processing an audio signal.

BACKGROUND OF THE INVENTION

Audio signal processing has been widely used e.g. in industrial processes, such as process control and condition monitoring systems, and in audio systems, such as sound processing to process an audio signal. Audio signal processing has been also widely used in telecommunication.

In audio signal processing, e.g. sound processing, situations such as mixing and mastering, it is important to enhance certain characteristics of the sound. This is done for example in a music mixing situation to achieve better overall sound balance of the final mix and to improve separation of the sound components i.e. instruments in the final mix.

In a today's sound processing situation several processing tools are used to achieve the desired results. These tools comprise typically e.g. filtering, dynamic processing and sound effects. Filtering, also called equalization, changes the frequency response of the source. Dynamic processing modifies the dynamical properties of the source material comprising at least gate, compressor, limiter, and expander. Sound effects comprise processors such as distortion, chorus, delay, and flanger.

The above-mentioned today's sound processing tools are controlled via several user controllable parameters. In a typical sound processing situation the problem is that a vast number of parameters has to be set correctly by a user of the system to achieve the desired result. This makes the sound processing very time consuming and requires strong knowledge and experiment from a person using a sound processing device in order to achieve proper results.

BRIEF SUMMARY OF THE INVENTION

Embodiments of the present invention provide a computer program product, device, system, method and user interface for processing an audio signal.

Naturally, when processed according to the invention, an audio signal typically is in a form not audible as such. E.g. the signal can be processed in digital form by a computer program. Thus, in some embodiments of the invention by an "audio signal" is meant that the signal processed according to the invention is or at least represents an audio signal. In some embodiments of the invention by an "audio signal" is meant that the signal processed according to the invention is or at least represents an audio signal audible to humans. Some examples of an audio signal according to the invention are human voices, sounds produced by animals or sounds produced by musical instruments.

In one embodiment of the invention, a computer program or a computer program product is defined for processing an audio signal. The computer program product includes a computer readable storage medium having computer-readable program instructions embodied in the medium. The computer-readable program instructions include first instructions for using auto-regressive (AR) modeling to create a residual signal from an input audio signal and second instructions for adding the residual signal to the input audio signal in order to produce a processed output audio signal. The residual is also known as the prediction error of linear predictive coding (LPC). The processing can be real-time and the processing can be controlled via few parameters. The application of the present invention may be executed at a signal processing device or system or it may be executed at a remote network device or system that is in network communication with the signal processing device or system.

The computer program product for providing audio signal processing may also include third instructions for at least one of pre-processing the input audio signal and
post-processing the output audio signal.

Pre-processing and post-processing of the audio signal may comprise at least one of the following: level adjustment, filtering, dynamic processing, and sound effects.

The invention is also defined by a signal processor that comprises at least a processing unit for creating a residual signal from an input signal using auto-regressive (AR) modeling and a mixing unit for adding the residual signal to the input signal in order to produce a processed output signal.

The invention is also defined by a signal processing device comprising at least a receiving unit configured to receive an input audio signal, a processing unit for creating a residual signal from an input audio signal using auto-regressive (AR) modeling, a mixing unit for adding the residual signal to the input audio signal in order to produce a processed output audio signal and an output unit configured to provide an output for the output audio signal.

The invention is also defined by a system for signal processing. According to one embodiment of the invention, the system comprises a power supply. Additionally the system comprises at least one digital input and/or analog input, and at least one digital and/or analog output. Analog-to-digital converters are needed in some embodiments to convert analog input signals to digital input signals. Similarly, digital-to-analog converters are needed in some embodiments to convert digital output signals to analog output signals. Further the system comprises a processor comprising at least a processing unit for creating a residual signal from an input audio signal using auto-regressive (AR) modeling and a mixing unit for adding the residual signal to the input audio signal in order to produce a processed output audio signal. Additionally the system comprises at least one controller for effecting AR modeling variables used in creating the residual signal.

The signal processing device or the system for signal processing may be embodied e.g. as a rack mounted device, pedal, such as guitar pedal, pedal instrument, digital mixing console, amplifier, front end processor, computer, network server, synthesizer, or any other fixed or portable signal processing device.

Additionally, the signal processing device may comprise a control unit in communication with the processing unit, which control unit provides a user a control of one or more variables used in the AR modeling.

The invention is also defined by a user interface application for a processing unit for creating a residual signal from an input audio signal using auto-regressive (AR) modeling. According to one embodiment, the user interface application comprises:

first instructions for displaying to a user one or more audio signal processing options, and
second instructions for effecting to AR modeling variables used in creating the residual inputs based on user inputs to the displayed audio signal processing options.

The displayed audio signal processing options may additionally comprise options for controlling one or more of the pre-processing of an input audio signal, post-processing of an output audio signal, mixing of a residual signal to an input audio signal, level of input audio signal, and level of output audio signal. The user interface application can be a computer program product directly loadable into the internal memory of a digital computer, comprising software code portions for performing at least part of the above-mentioned steps when said product is run on a computer.

The invention is also defined by a method for signal processing comprising at least steps of using auto-regressive (AR) modeling to create a residual signal from an input audio signal and adding the residual signal to the input audio signal in order to produce a processed output audio signal.

In an embodiment of the invention the audio signal is a signal audible by humans.

In an embodiment of the invention the audio signal is a signal in the frequency range of 0-20000 Hz, or in the frequency range of 20-20000 Hz.

As such the present invention mitigates problems related to signal processing, especially related to audio signal processing. The present invention also addresses the need to provide users with signal processing options to enhance sound of an audio signal especially relating to mixing and mastering purposes. The applicant has realized that the residual signal of an audio signal contains such components of a sound that are usable to enhance the sound of an audio signal in sound processing. Thus one advantage of the present invention is that the sound of an audio signal can be effectively changed and processing results for mixing and mastering purposes can be achieved instantly and controllably.

BRIEF DESCRIPTION OF THE DRAWINGS

Figure 1:
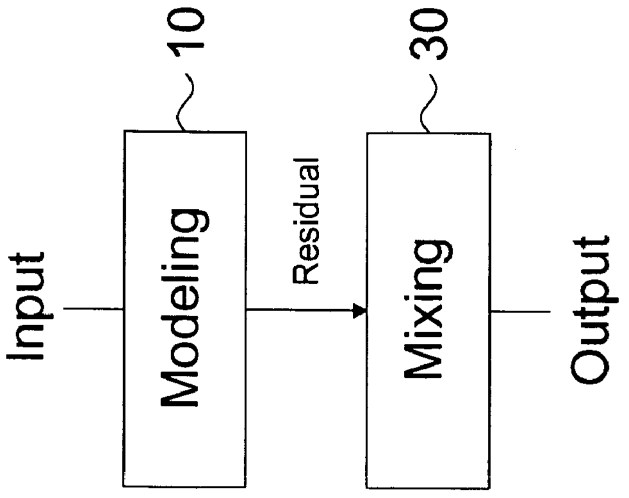

Having thus described the invention in general terms, reference will now be made to the accompanying drawings, which are not necessarily drawn to scale, and wherein:

FIG. 1 is a block diagram of a signal processing arrangement in accordance with an embodiment of the present invention.

Figure 2:
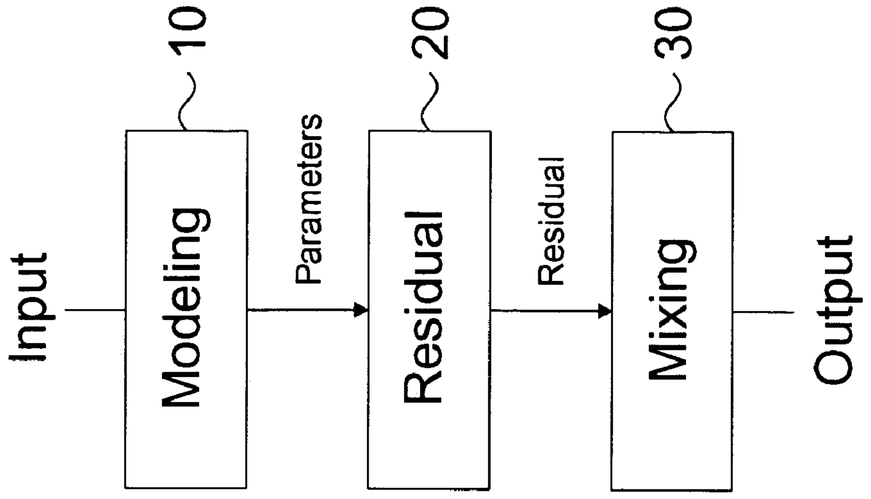

FIG. 2 is a block diagram of a signal processing arrangement in accordance with an embodiment of the present invention.

Figure 3:
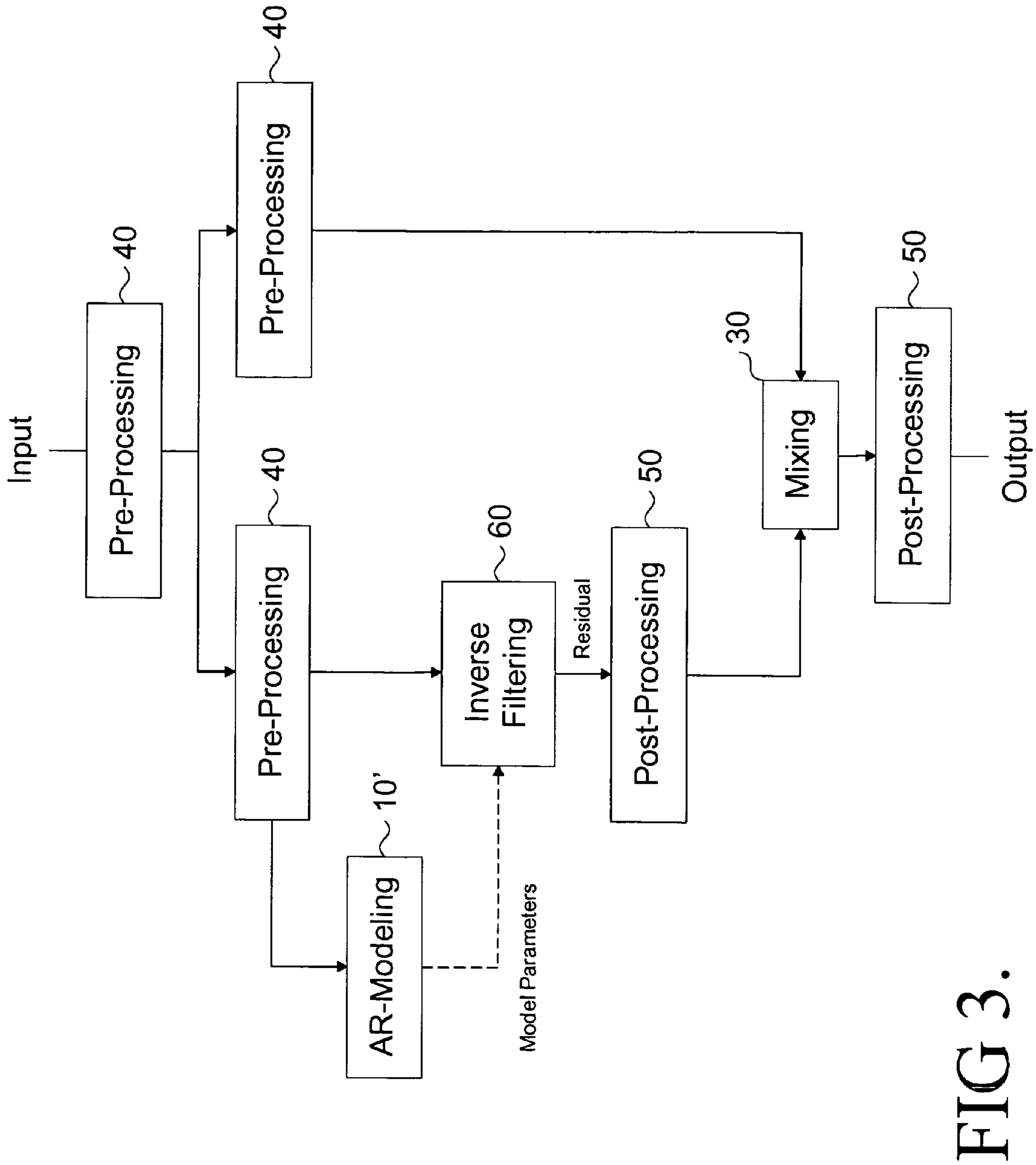

FIG. 3 is a block diagram of a signal processing arrangement in accordance with an embodiment of the present invention.

Figure 4:
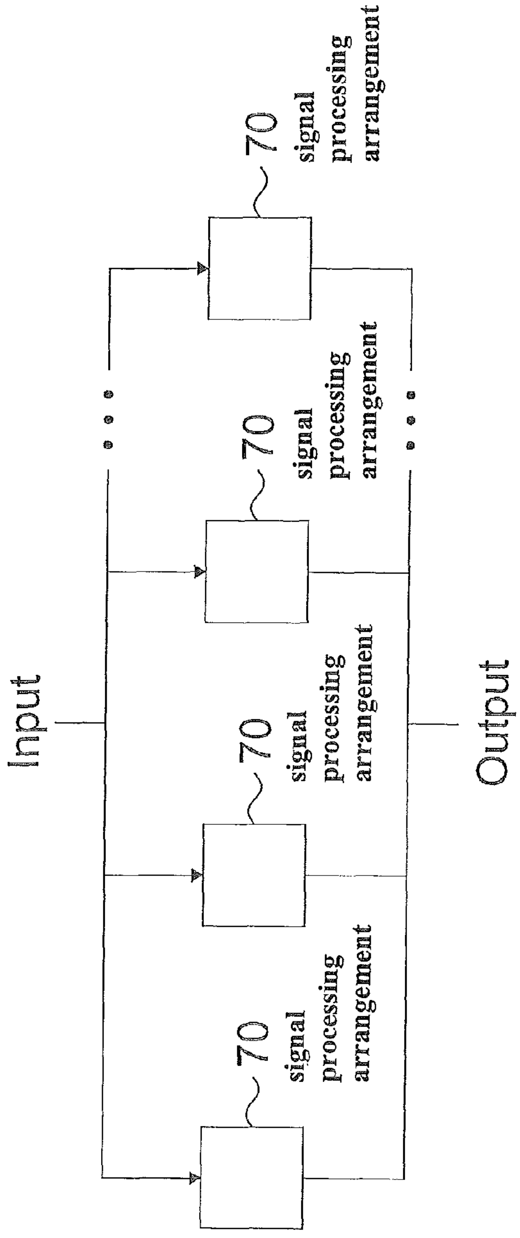

FIG. 4 is a block diagram of a signal processing arrangement in accordance with an embodiment of the present invention.

Figure 5:
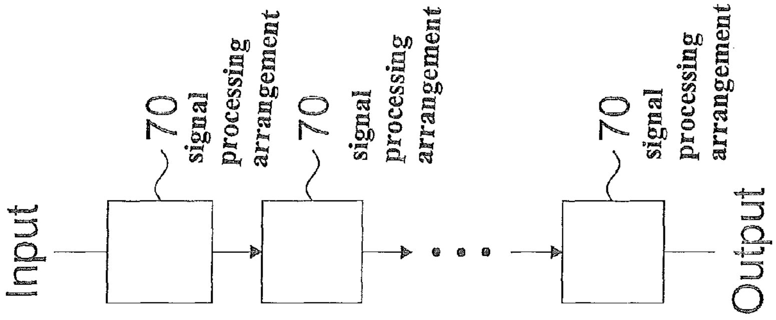

FIG. 5 is a block diagram of a signal processing arrangement in accordance with an embodiment of the present invention.

Figure 6:
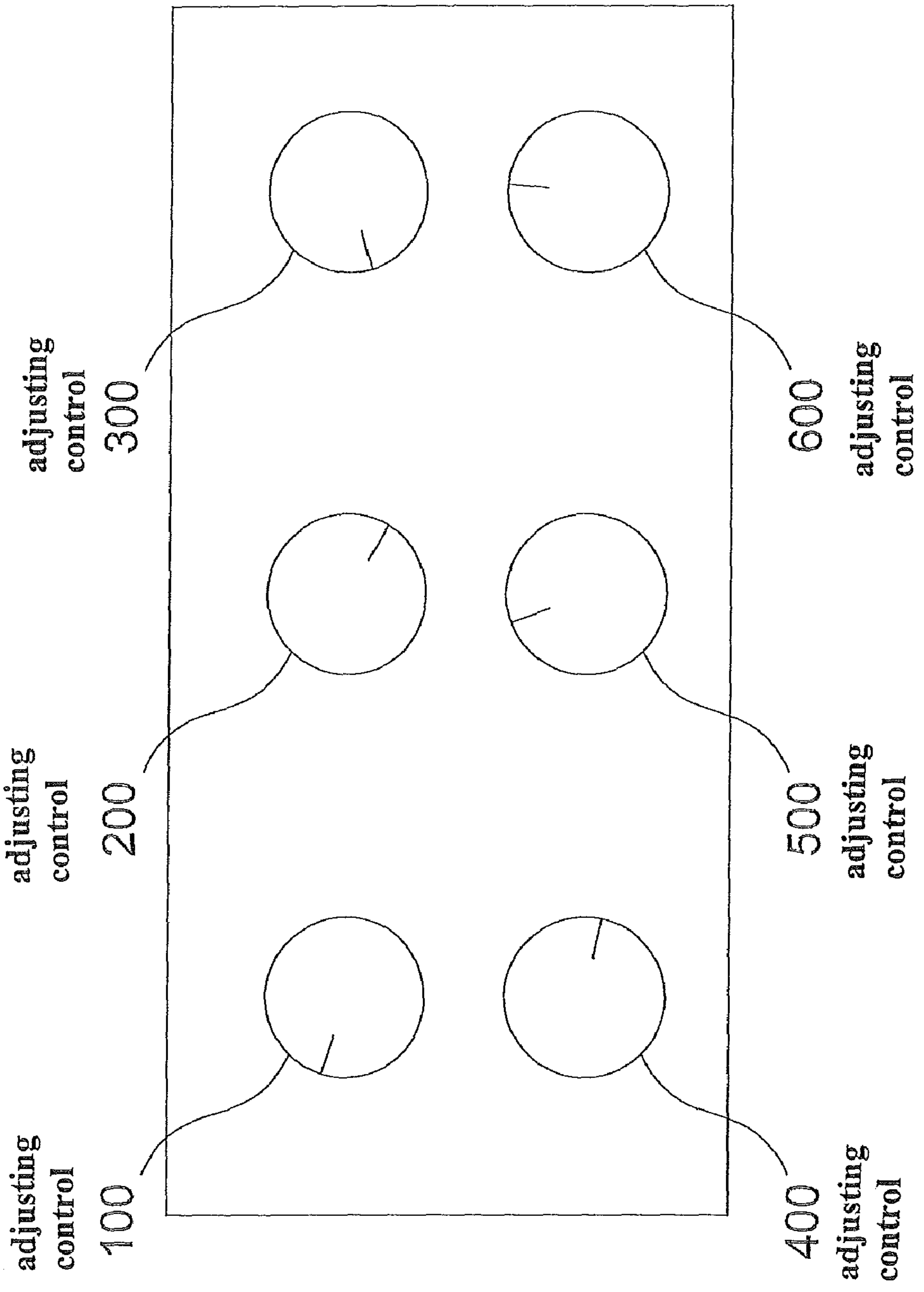

FIG. 6 illustrates schematically a User Interface in accordance with an embodiment of the present invention.

DETAILED DESCRIPTION OF THE INVENTION

In the following the invention is described in connection with audio signal processing. The invention can be used to process audio signals in various systems including entertainment, telecommunication, industrial processes and other systems, whether digital or analogue. A man skilled in the art can apply the embodiments to systems containing corresponding characteristics.

Auto-regressive modeling of measured data is commonly used in numerous signal processing applications. An auto-regressive (AR) model is defined by equation $$y_n = -\sum_{m=1}^{p} a_m y_{n-m} + e_n, \tag{1}$$

where $y_n$ are the signal samples, p is the model order, $a_m$ are the model coefficients, and $e_n$ is the residual. The model coefficients $a_m$ are calculated by minimizing the total energy of the residual $$E = \sum_n e_n^2 \tag{2}$$

There exist several methods for estimating the AR parameters. The least squares method (also known as the covariance method) and the Yule-Walker method (also known as the autocorrelation method) are the mostly used approaches for historical reasons as Hoon has pointed out in [1]. It is commonly known that Burg's method is considered preferable for applications, which require models of high accuracy, e.g., signal extrapolation [2] and detection [1].

According to one embodiment of the present invention AR parameters can be calculated using Burg's algorithm. From Eq. (1) it can be seen that the residual $e_n$ can be calculated from the signal $y_n$ by $$e_n = y_n + \sum_{m=1}^{p} a_m y_{n-m} = \sum_{m=0}^{p} a_m y_{n-m} \tag{3}$$

where $a_0=1$. If the signal frame consists of N samples $y_0, y_1, \ldots, y_{N-1}$, the residual samples $e_p, e_{p+1}, \ldots, e_{N-1}$ can be regarded as the output of a finite impulse response (FIR) prediction error filter. This FIR filter can be implemented through a lattice structure. The equations of the lattice filter are $$\begin{aligned} f_n^{(l)} &= f_n^{(l-1)} + k_l b_{n-1}^{(l-1)} \\ b_n^{(l)} &= b_{n-1}^{(l-1)} + k_l f_n^{(l-1)} \end{aligned} \quad n = l, l+1, \ldots, N-1, \tag{4}$$

where $f_n^{(l)}$ and $b_n^{(l)}$ are the forward and backward prediction errors and $k_l$ are the reflection coefficients of the stage l. The initial values for the residuals are $f_n^{(0)}=b_n^{(0)}=y_n$. Burg's algorithm calculates the reflection coefficients $k_l$ so that they minimize the sum of the forward and backward residual errors [3]. This implies an assumption that the same AR coefficients can predict the signal forward and backward. The sum of residual energies in stage l is $$E_l = \sum_{n=l}^{N-1} (f_n^{(l)})^2 + (b_n^{(l)})^2. \tag{5}$$

Minimizing $E_l$ with respect to the reflection coefficient $k_l$ yields $$\frac{\partial E_l}{\partial k_l} = 2\sum_{n=l}^{N-1} \{(f_n^{(l-1)} + k_l b_{n-1}^{(l-1)})b_{n-1}^{(l-1)} + (b_{n-1}^{(l-1)} + k_l f_n^{(l-1)})f_n^{(l-1)}\} = 0 \tag{6}$$

from which the reflection coefficients can be solved, i.e., $$k_l = \frac{-2\sum_{n=l}^{N-1} f_n^{(l-1)} b_{n-1}^{(l-1)}}{\sum_{n=l}^{N-1} (f_n^{(l-1)})^2 + (b_n^{(l-1)})^2}. \quad (7)$$

The AR coefficients $a_m$ can be obtained from the reflection coefficients $k_l$ via the Levinson-Durbin algorithm. The recursion is initialized with $a_0^{(0)}=1$ and $$\begin{aligned} a_m^{(l)} &= a_m^{(l-1)} + k_l a_{l-m}^{(l-1)} \quad m = 1, 2, \ldots, l-1 \\ a_l^{(l)} &= k_l \end{aligned} \quad (8)$$

is repeated for $l=1, 2, \ldots, p$. At the end of the iterations, $a_m^{(p)}$ gives the desired prediction error filter coefficients $a_m$ of Eq. (3). Equation (7) ensures that $|k_l|<1$ and therefore Burg's method is guaranteed to provide a stable model.

According to one embodiment of the present invention frequency warping is used in AR modeling. This gains some benefits especially when the energy distribution of the signal is concentrated on the lower or higher frequency range. Previously, a frequency-warped version of the Yule-Walker method has been employed successfully in several audio-related applications [4]. Other applications of frequency warping include analysis, synthesis, and de-noising of audio signals [5].

The time-domain representation of a signal relates to its spectrum via the Fourier transform. The frequency-resolution of the resulting spectrum is uniform along the frequency axis. Signal analysis on non-uniform frequency-resolutions or on frequency-warped scales can be achieved by means of a frequency-mapping operator. This basically means that the unit-delays, $z^{\{-1\}}$, of the employed filter structures are replaced with first-order allpass filters, D(z). These allpass filters can be regarded as frequency-dependent delay elements and are defined by $$\tilde{z}^{-1} = D(z) = \frac{z^{-1} - \lambda}{1 - \lambda z^{-1}}. \quad (9)$$

Conversely to the linear phase response of an ordinary unit-delay, the phase response of D(z) can be made non-linear by adjusting the warping factor parameter $\lambda$. Indeed, the mapping from the uniform to the warped frequency scale is governed by the phase response of D(z), which is given by [6]

$$\tilde{\omega} = \arctan\left\{\frac{(1-\lambda^2)\sin(\omega)}{(1+\lambda^2)\cos(\omega) - 2\lambda}\right\}, \quad (10)$$

where $\omega=2\pi f/f_s$ and $f_s$ is the sampling frequency. For positive values of $\lambda$, the resolution at low frequencies is increased. On the contrary, negative values of $\lambda$ yield a higher resolution at high frequencies. Suitable values of $\lambda$ can be chosen depending on the application. For instance, in [7] it is shown that an approximation of the frequency resolution of the human auditory system is attained by setting $\lambda=0.723$.

Warped linear predictive coding can be carried out similarly to standard methods. For instance, the coefficients $\tilde{a}_m$ of a warped prediction filter can be estimated via the warped autocorrelation normal equations. In these equations, the conventional autocorrelation function $r_k=E\{y_n y^*_{n-k}\}$ is replaced with $$\tilde{r}_k=E\{\tilde{\delta}_0[y_n]\tilde{\delta}_k[y^*_n]\}, \quad (11)$$

where E is the expectation operator and $\tilde{\delta}_k[\cdot]$ is a generalized shift operator defined by [4]

$$\tilde{\delta}_k[y_n] = \underbrace{d_n * d_n * \ldots * d_n}_{k \text{ fold convolutions}} * y_n, \quad (12)$$

with $d_n$ being the impulse response of the allpass filter. Yet, the equation system can be solved efficiently via the Levinson-Durbin algorithm. Finally, the prediction error filter is given by $$\sum_{m=1}^{p} \tilde{\alpha}_m D(z)^m. \quad (13)$$

According to one embodiment of the present invention, input signal is processed frame-by-frame using frequency warped Burg's method. The warped Burg's method is based on warping the lattice filter. This is done by replacing the delay elements with warping allpass filters. To calculate the warped prediction error in stage l we need the allpass filtered backward residual $$\tilde{b}_n^{(l)} = b_{n-1}^{(l-1)} - \lambda\left[b_n^{(l-1)} - \tilde{b}_{n-1}^{(l-1)}\right], \; n = l, l+1, \ldots, N-1, \quad (14)$$

where $\lambda$ is the warping factor. Because this is a recursive filter the initial condition (i.e. the value of $\tilde{b}_{l-1}^{(l)}$ has to be set. Using $\tilde{b}_{l-1}^{(l)}=0$ is the most obvious choice.

Warping also changes the lattice equations of Eq. (4) to $$\begin{aligned} f_n^{(l)} &= f_n^{(l-1)} + \tilde{k}_l \tilde{b}_{n-1}^{(l-1)} \\ b_n^{(l)} &= \tilde{b}_{n-1}^{(l-1)} + \tilde{k}_l f_n^{(l-1)} \end{aligned} \quad n = l, l+1, \ldots, N-1 \quad (15)$$

The resulting equation for the reflection coefficient is $$k_l = \frac{-2\sum_{n=l}^{N-1} f_n^{(l-1)} \tilde{b}_{n-1}^{(l-1)}}{\sum_{n=l}^{N-1} (f_n^{(l-1)})^2 + (\tilde{b}_{n-1}^{(l-1)})^2} \quad (16)$$

From Eq. (14) it can be seen that parameter value $\lambda=0$ reduces the algorithm to ordinary Burg's method.

According to one embodiment of the present invention, input signal is processed sample-by-sample using frequency warped Burg's method. As disclosed above, according to one embodiment of the present invention AR modeling is accomplished using frame-by-frame processing. Frame-by-frame modeling introduces latency to the signal processing, which is not favorable in some solutions. As with any frame-by-frame algorithm full frame has to be available for the algorithm before any output can be produced. This latency makes AR modeling more or less unusable in real-time signal processing solutions, such as sound effects, especially when long frame lengths are required. By using e.g. the exponential weighting (EW) method [8] the latency reduces down to the order of the AR model.

The idea in EW method for sample-by-sample update for the model parameters is to use time-domain exponential weighting to calculate the expectation values in Eq. (16). This can be achieved by $$\sum_{n=l}^{N-1} (f_n^{(l)})^2 \approx F_n^{(l)} = \alpha F_{n-1}^{(l)} + (1-\alpha) f_n^{(l)} f_n^{(l)} \tag{17}$$

$$\sum_{n=l}^{N-1} (\tilde{b}_n^{(l)})^2 \approx B_n^{(l)} = \alpha B_{n-1}^{(l)} + (1-\alpha) \tilde{b}_n^{(l)} \tilde{b}_n^{(l)}$$

$$\sum_{n=l}^{N-1} f_n^{(l)} \tilde{b}_n^{(l)} \approx X_n^{(l)} = \alpha F_{n-1}^{(l)} + (1-\alpha) f_n^{(l)} \tilde{b}_n^{(l)},$$

where $\alpha$ is a smoothing parameter. The higher the value of $\alpha$ is the more weight is given to the past values and the longer is the time required for the model to adapt to changes in the source. The time constant of the adaptation is $$\tau = \frac{1-\alpha}{\alpha}\Delta t, \tag{18}$$

where $\Delta t$ is the sampling interval. Now the reflection coefficient $\tilde{k}_l$ can be calculated from $$\tilde{k}_l(n) = \frac{-2X_n^{(l)}}{F_n^{(l)} + B_n^{(l)}}. \tag{19}$$

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a block diagram of a signal processing arrangement according to one embodiment of the invention. The figure only shows elements that are necessary for understanding the present invention. According to the invention at the first stage, in block 10, the input audio signal is modeled by using AR modeling, which means solving the model coefficients $a_m$ in Eq. (1). The user can control the modeling process via user controllable parameters that may include the model order p in Eq. (1), warping factor $\lambda$ in Eq. (14), and the adaptation constant $\alpha$ in Eq. (17). By modifying these parameters the user can change the sound properties of the output signal. These controls are illustrated in FIG. 6. In the embodiment of the invention according to FIG. 1 the AR modeling in block 10 is performed using such method where the residual signal is calculated simultaneously in the modeling process. Such method can be e.g. Burg's method. The residual signal is mixed, typically summed, to the input signal in block 30. The processing of the signal can be performed frame-by-frame based or sample-by-sample based and it can be performed real-time.

FIG. 2 illustrates a block diagram of a signal processing arrangement according to a second embodiment of the invention. The figure only shows elements that are necessary for understanding the present invention. In some cases it is favorable or necessary to first calculate the AR parameters $a_m$ in Eq. (1) and separately calculate the residual signal using the AR parameters. According to the embodiment of the invention illustrated in FIG. 2 at the first stage, in block 10', the input audio signal is modeled by using AR modeling to produce the AR model parameters. The user can control the modeling process via user controllable parameters that may include the model order p in Eq. (1), warping factor $\lambda$ in Eq. (14), and the adaptation constant $\alpha$ in Eq. (17). These controls are illustrated in FIG. 6. At the second stage the residual signal of the AR model is calculated in separate block 20, which can be achieved via inverse filtering the input audio signal using a filter constructed with the AR parameters calculated in the first step in block 10'. The calculation of the residual signal via inverse filtering is not described in detail here because it is commonly known to a person skilled in the art. In the third stage, block 30, the input audio signal and the residual signal are additively mixed together to produce the output audio signal. The processing of the signal can be performed frame-by-frame based or sample-by-sample based and it can be performed real-time.

FIG. 3 illustrates a block diagram of a signal processing arrangement according to one embodiment of the present invention. A signal, e.g. an audio signal from a musical instrument or vocal source, is divided into two, preferably equal, signals here called first and second signals. The first signal is fed through a pre-processor, which pre-processing may be any kind of level adjusting, filtering, dynamic processing or sound effect. After pre-processing AR modeling is applied to the resulting signal in block 10'. The AR model parameters are used to construct an inverse filter in block 60. The output signal can be changed by varying the user controllable parameters that control the AR modeling process. These controls are illustrated in FIG. 6. The pre-processed first signal is filtered by the inverse filter in block 60 resulting in the residual signal. The processing of blocks 10' and 60 can be replaced with block 10 used in FIG. 1, where the residual signal is directly calculated in the AR modeling process. Post-processing is then applied to the residual signal in block 50, which could be any kind of level adjusting, filtering, dynamic processing, sound effect, or no processing. The second signal is fed through a pre-processor, block 40, and the resulting signal is additively mixed to the post-processed residual signal in block 30 so that the post-processed residual signal obtained from the first signal and the pre-processed second signal are synchronized time vice. In the mixing stage in block 30 the weighted versions of the two signals are added together. As disclosed in FIG. 3, it is possible that also the input signal is fed through a pre-processor block 40. Additionally, as disclosed in FIG. 3 it is possible that the mixed signal is post-processed in block 50 to finally produce the output signal. Output signal may be further processed with other signal processors and it may be mixed together with other audio signals in a music-mixing situation. In the case of rack mounted device the output may be routed to another audio processing device such as e.g. mixing console. In the case of guitar pedal the output signal may be connected to a guitar amplifier. It is also possible that no pre-processing or post-processing is applied to one or more of the input signal, first signal; second signal, residual or output signal.

FIG. 4 illustrates a block diagram of a signal processing arrangement according to another embodiment of the present invention. The block 70 comprises a whole process described in FIG. 1, FIG. 2, or FIG. 3. In this embodiment of the invention two or more such processing elements are connected in parallel to produce the output signal. If warped AR modeling is used, then the separate processing blocks 70 can be focused to different frequency areas by selecting different values for the warping factor λ in Eq. (14).

FIG. 5 illustrates a block diagram of a signal processing arrangement according to another embodiment of the present invention. The block 70 comprises a whole process described in FIG. 1, FIG. 2, or FIG. 3. In this embodiment of the invention two or more such processing elements are connected in series to produce the output signal.

The signal processing of the present invention can be controlled via several parameters. The user controls can include for example controls for at least one of the amount of the added residual signal, frequency region focus, model order of the AR model, level control for input signal and/or output signal, and adaptation speed of the AR modeling. These controls are disclosed as an example of one embodiment of user interface illustrated in FIG. 6.

The user interface disclosed in FIG. 6 presents a user interface application which can be displayed for a user e.g. via a computer monitor. The controls 100-600 are provided by first instructions for displaying to a user one or more signal processing options. By adjusting the presented controls, the user can modify the quality of an output signal.

The amount of the added residual signal can be controlled by multiplying the signal with a weighting factor prior to adding the residual to the input signal or pre-processed input signal by adjusting control 100.

The processing can be focused towards desired frequency region by using warped AR modeling for obtaining the residual signal. The user can control this by varying the value of the warping factor λ in Eq. (14) by adjusting control 200.

The user can also change the processing result by altering the model order of the AR model i.e. the number of model coefficients p in Eqs. (1), (3), and (13) by adjusting control 300.

The user can also control the level of input audio signal by adjusting control 400 and the level of output audio signal by adjusting control 500.

The adaptation speed of the AR modeling can be controlled by the user via the adaptation constant a in Eq. (17) by adjusting control 600.

It is also possible that one or more of the controls disclosed in FIG. 6 can be provided for a user in a form of control buttons, knobs or regulators as a part of a signal processing device. For example the signal processing device may be a guitar pedal having control buttons or knobs for controlling one or more of the mentioned controls. Similarly, if the signal processing device is a rack mounted device, the device may comprise controls needed.

REFERENCES CITED IN THE DESCRIPTION

[1] M. J. L. de Hoon, T. H. J. J. van der Hagen, H. Schoonewelle, and H. van Dam, "Why Yule-Walker Should not be Used for Autoregressive Modelling," Annals of Nuclear Energy, Vol. 23, 1996.

[2] I. Kauppinen, J. Kauppinen, and P. Saarinen, "A Method for Long Extrapolation of Audio Signals," J. Audio Eng. Soc., Vol. 49, no. 12, December, 2001.

[3] J. P. Burg, "A New Analysis Technique for Time Series Data," NATO Advanced Study Institute on Signal Processing with Emphasis on Underwater Acoustics, Enschede, The Netherlands, August, 1968.

[4] A. Härmä, M. Karjalainen, V. Välimäki, L. Savioja, U. Laine, and J. Huopaniemi, "Frequency-Warped Signal Processing for Audio Applications," J. Audio Eng. Soc., Vol. 48, No. 11, November, 2000.

[5] G. Evangelista and S. Cavaliere, "Discrete Frequency Warped Wavelets: Theory and Applications," IEEE Trans. Signal Processing, Vol. 46, No. 4, April, 1998.

[6] H. W. Strube, "Linear Prediction on a Warped Frequency Scale," J. Acoust. Soc. Am., Vol. 68, No. 4, October, 1980.

[7] J. O. Smith and J. S. Abel, "Bark and ERB Bilinear Transforms," IEEE Trans. Speech Audio Processing, Vol. 7, No. 6, November, 1999.

[8] Kari Roth and Ismo Kauppinen, "Exponential Weighting Method for Sample-by-Sample Update of Warped AR-model," Proc. Int. Conf. on Digital Audio Effects (DAFx'04), Naples, Italy, October, 2004.

The invention claimed is:

1. A computer program product for signal processing, the computer program product comprising a non-transitory computer readable storage medium having computer-readable program instructions embodied in the medium, the computer-readable program instructions comprising:

first instructions for using auto-regressive (AR) modeling frame-by-frame employing frequency warped Burg's method to create a residual signal from an input audio signal; and second instructions for adding the residual signal to the input audio signal in order to produce a processed output audio signal.

2. The computer program product of claim 1, further comprising third instructions for at least one of:

pre-processing the input audio signal; and post-processing the output audio signal.

3. A processor for processing a signal, said processor comprising at least:

a processing unit for creating a residual signal from an input audio signal using auto-regressive (AR) modeling frame-by-frame employing frequency warped Burg's method, and a mixing unit for adding the residual signal to the input audio signal in order to produce a processed output audio signal.

4. A signal processing device, the device comprising at least:

a receiving unit configured to receive an input audio signal;

a processing unit for creating a residual signal from the input audio signal using auto-regressive (AR) modeling frame-by-frame employing frequency warped Burg's method, a mixing unit for adding the residual signal to the input audio signal in order to produce a processed output audio signal; and an output unit configured to provide an output for the output audio signal.

5. A device of claim 4, the device further comprising a control unit in communication with the processing unit, said control unit providing a user with control of one or more variables used in the AR modeling.

6. A device of claim 4, where the device is a guitar pedal.

7. A system for signal processing, the system comprising at least:

a power supply;

at least one of digital input and analog input;

a processor comprising at least a processing unit for creating a residual signal from an input audio signal using auto-regressive (AR) modeling frame-by-frame employing frequency warped Burg's method, and a mixing unit for adding the residual signal to the input audio signal in order to produce a processed output audio signal;

at least one controller for effecting AR modeling variables used in creating the residual signal; and at least one of digital output and analog output.

8. A method for processing a signal, the method comprising at least the steps of:

using, by the signal processor, auto-regressive (AR) modeling frame-by-frame employing frequency warped Burg's method to create a residual signal from an input audio signal; and adding, by the signal processor, the residual signal to the input audio signal in order to produce a processed output audio signal.

9. A method of claim 8, wherein AR parameters used in the AR modeling are calculated using Burg's algorithm.

10. A method of claim 8, wherein frequency warping is used in the AR modeling.

11. A method of claim 8, wherein the input audio signal and/or the output audio signal is a signal audible by humans.

12. A method of claim 8, wherein the input audio signal and/or the output audio signal is a signal in the frequency range of 20-20000 Hz.

13. A method of claim 8, wherein the input audio signal is a human voice or a sound of a musical instrument.

14. A computer program product for signal processing, the computer program product comprising a non-transitory computer readable storage medium having computer-readable program instructions embodied in the medium, the computer-readable program instructions comprising:

first instructions for using auto-regressive (AR) modeling sample-by-sample employing frequency warped Burg's method to create a residual signal from an input audio signal; and second instructions for adding the residual signal to the input audio signal in order to produce a processed output audio signal.

15. A processor for processing a signal, said processor comprising at least:

a processing unit for creating a residual signal from an input audio signal using auto-regressive (AR) modeling sample-by-sample employing frequency warped Burg's method; and a mixing unit for adding the residual signal to the input audio signal in order to produce a processed output audio signal.

16. A signal processing device, the device comprising at least:

a receiving unit configured to receive an input audio signal;

a processing unit for creating a residual signal from the input audio signal using auto-regressive (AR) modeling sample-by-sample employing frequency warped Burg's method;

a mixing unit for adding the residual signal to the input audio signal in order to produce a processed output audio signal; and an output unit configured to provide an output for the output audio signal.

17. A system for signal processing, the system comprising at least:

a power supply;

at least one of digital input and analog input;

a processor comprising at least a processing unit for creating a residual signal from an input audio signal using auto-regressive (AR) modeling sample-by-sample employing frequency warped Burg's method and a mixing unit for adding the residual signal to the input audio signal in order to produce a processed output audio signal;

at least one controller for effecting AR modeling variables used in creating the residual signal; and at least one of digital output and analog output.

18. A method for processing a signal, the method comprising at least the steps of:

using, by the signal processor auto-regressive (AR) modeling sample-by-sample employing frequency warped Burg's method to create a residual signal from an input audio signal; and adding, by the signal processor the residual signal to the input audio signal in order to produce a processed output audio signal.

* * * * *